US005885406A

United States Patent [19]

Tiefel

[11] Patent Number: 5,885,406

[45] Date of Patent: Mar. 23, 1999

[54] ADJUSTABLE DISPENSING GRID FOR LABELER AND METHOD OF APPLYING A LABEL

[75] Inventor: Rick Lee Tiefel, Clay City, Ind.

[73] Assignees: Sony Corporation, Tokyo, Japan; Digital Audio Disc Corporation, Terre Haute, Ind.

[21] Appl. No.: 782,067

[22] Filed: Jan. 13, 1997

[51] Int. Cl.[6] .............................. B32B 31/00; B65C 9/14

[52] U.S. Cl. ................... 156/542; 156/497; 156/DIG. 38

[58] Field of Search .................................... 156/542, 541, 156/556, 566, DIG. 38, 497; 269/21; 271/96, 195

[56] References Cited

U.S. PATENT DOCUMENTS 2,492,908 12/1949 Von Hofe .................... 156/DIG. 31 X
3,888,725 6/1975 French ........................ 156/DIG. 38 X
3,984,277 10/1976 French et al. ............... 156/DIG. 38 X
4,025,382 5/1977 Del Rosso .......................... 156/542 X
4,526,648 7/1985 Tochtermann .............. 156/DIG. 38 X
5,543,001 8/1996 Casillo et al. ............................ 156/60

OTHER PUBLICATIONS

Operator's Manual for Label–Aire—Model 2111 With Microprocessor Controls, Revised Oct. 1987.

*Primary Examiner*—James Engel
*Attorney, Agent, or Firm*—Wood, Herron & Evans, L.L.P.

[57] ABSTRACT

A label handling apparatus (40) connected to an air source (90) selectively providing both a positive air pressure and an air suction has a plate (70, 100) which receives a label (26) from a peeler (34) across a lower surface (46) of the plate (100). The plate (100) includes a plurality of holes (102) having upper ends in fluid communication with the air source (90) and lower ends intersecting the lower surface (46) of the plate (!00). Pins (60) are disposed for sliding motion within the plate (70, 100) to selectively block and unblock the fluid communication between selected ones of the holes (102) and the air source (26). By simply moving the pins (60) to cover or uncover selected holes (102), the apparatus can be quickly adjusted to accommodate any size label.

20 Claims, 4 Drawing Sheets

ADJUSTABLE DISPENSING GRID FOR LABELER AND METHOD OF APPLYING A LABEL

FIELD OF THE INVENTION

This invention relates to labeling machines and more particularly, to an improved label handling apparatus and a method of applying a label.

BACKGROUND OF THE INVENTION

The application of labels to products or parts moving along a conveyor line is a process that is widely used in industry. Generally, the labels are contained and stored on a long continuous strip of webbing or backing material that is wound on a reel mounted on a labeler. When the reel is rotated, a label to be applied is peeled off of its backing strip and held or suspended on a grid plate by a partial vacuum. A part sensor located either on the conveyor or the labeler detects the presence of a part under the suspended label. After a short time delay, a positive air pressure is applied to the back of the label; and it is blown off of the grid plate onto the product.

While there are many different types and varieties of labeling machines, of particular interest is the model 2111-ST labeler manufactured by Label-Aire Inc. and commercially available from the Label-Aire Division of Wallace Computer Services, Inc. of Indianapolis, Ind. With that labeling machine, the strip of backing material containing the labels is fed over an upper surface of a peeler plate, over a peeler plate edge and then, back along a path generally adjacent a lower surface of the peeler plate. The backing material is typically more flexible than the labels attached thereto; and therefore, the backing material readily bends around the peeler plate edge. The label being of a stiffer material will resist bending around the edge of the peeler plate and begin to separate from the backing material strip as the feeding action or motion of the backing material strip continues.

The label continues to feed in a generally horizontal direction beneath a grid plate. The grid plate is perforated by a pattern of holes which are in fluid communication with a plenum above the gird plate having a negative pressure with respect to atmospheric pressure, that is, a partial vacuum. The partial vacuum is normally created by a fan that pulls air through the grid plate holes, thereby creating a suction force on the bottom surface of the grid plate to suspend or hold the label thereon. The feed of the backing material strip continues until the label is completely separated therefrom and is held by the suction force on the grid plate.

The labeling machine is positioned with respect to a moving conveyor line such that a part sensor mounted on the conveyor or the labeler defines a label application position with respect to the suspended label. When the part is at that position, air under a positive pressure is blown through tubes connected to selected ones of the holes on the top side of the grid. The fluid pressure through the tubes is sufficient to overcome the vacuum created by the fan, and the label is blown off of the bottom of the grid and onto the part on the conveyor line.

The operation of the above described labeling machine has proven to be satisfactory in the application of labels to products, for example, plastic cases in which CD's are packaged. In the normal course of a packaging process, the labels being applied to the products may change, or the products themselves may change, thereby requiring different labels. When a different size label is to be used, the labeling machine must be set up for the new label. With each different size label, the application of the pressurized fluid through the holes in the grid must be adjusted. The grid is manufactured to a size accommodating the largest label that the labeling machine will accept. Therefore, the grid may have an area of four or more inches on a side. Further, with each different size label, the suction and blow off forces through the bottom of the grid must be adjusted to most effectively hold and then subsequently blow the label onto the part.

To initially set up the above-described labeling machine, a cover forming a plenum on top of the grid hole is removed. Next, a masking plate is put in place on top of the grid plate so that it covers all of the holes. By viewing down the edge of the grid plate that receives the label, a sample label is located on the upper surface of the masking plate so that it overlies the location of a production label on the lower surface of the grid plate. The masking plate is then removed from the grid plate; and using the sample label as a template, an opening is cut in the masking plate to correspond to the size of the sample label. After the label-shaped hole in the masking plate is cut, the masking plate is again mounted on the upper surface of the grid so that the holes outside of the perimeter of the label cut-out are covered.

The positive pressure to blow the label off of the bottom of the grid plate is adjusted by locating a plurality, for example, 18, flexible tubes having a one end connected to a manifold. The other, distal ends of the tubes are inserted into selected ones of the uncovered holes in the top of the grid plate such that the label is most effectively held on and then subsequently blown off the grid plate. The number and location of the tubes will depend on the area of the label, the label material and thickness. Preferably, more tubes are used in a pattern at the center of a label with fewer tubes being located with respect to the label periphery.

The cover plate providing a plenum for the vacuum fan is then put in place over the grid plate, and the labeling machine is ready for testing. Therefore, the vacuum or suction from the fan is limited to those holes which are not covered by the masking plate and those holes to which pressure tubes are not connected. The placement of the tubes can be time-consuming process, especially the first time that a label is used. Once a proper tube placement is determined, it can be recorded for future reference.

Several test labels are then run through the labeling machine and applied to the part on the conveyor to test the setup of the machine. When working with new labels which have not previously been used, and for which the appropriate location of the pressure tubes is not known, the initial placement of the pressure tubes may result in the label not being applied to the desired location on the part. In other situations, the location of the pressure tubes may result in the position of successive labels varying beyond an acceptable tolerance. Ideally, each label should be applied at precisely the same relative location on each product or case on the conveyor line. If the labels are not being applied to the proper location or the label is being applied inconsistently, that is, the label is not being repeatably applied at the same location on the part, a portion of the set up procedure must be repeated. For example, at the least, the plenum cover must be removed in order to relocate the pressure tubes, and then the plenum cover is reinstalled. The above process is repeated until a pattern of pressure tube locations is found that provides the desired accuracy and consistency in the label placement.

Consequently, there is a need for a label handling system for a labeling machine that permits a faster set up procedure.

SUMMARY OF THE INVENTION

The present invention provides a labeling handling apparatus for a labeling machine that permits the labeling machine to be adjusted to handle a new label in approximately one-half the time of prior systems. Therefore, the label handling apparatus is especially useful for those applications in which different labels are to be applied by the labeling machine.

According to the principles of the present invention and in accordance with the preferred embodiments, a label handling apparatus receives a label from a peeler that has stripped the label from a backing material. A source of pressurized air selectively provides both a positive air pressure and an air suction. A plate is located near the peeler and receives the label from the peeler on a lower surface of the plate. The plate includes a plurality of holes having first ends in fluid communication with the air source and second ends intersecting the lower surface of the plate. At least two elements are disposed for sliding motion with the plate to selectively block and unblock the fluid communication between selected ones of the holes and the air source. Thus, when the label is received from the peeler, air suction is applied to the holes to hold the label on the lower surface of the plate. Upon terminating the air suction and providing a positive pressure, the label is blown off of the lower surface of the plate. Therefore, by simply moving the adjusting elements to cover or uncover selected holes, the apparatus has the advantage of being quickly adjusted to accommodate any size label.

In one aspect of the invention, the plate includes a plurality of cavities, for example, enclosed slots, disposed between the first ends of the holes and the source of pressurized fluid. Each of the slots is located with respect to a group of holes. A plurality of elements, for example, adjustable pins, is disposed for sliding motion in respective ones of the plurality of slots. Thus, any one of the holes in the plate can be covered or uncovered by simply moving one of the pins in the slot which advantageously permits the apparatus to be quickly and accurately adjusted to a different size label.

In another embodiment of the invention, a method of applying a label to a surface of a part includes applying a subatmospheric pressure to a plenum connected to a plurality of holes intersecting a surface of a plate. A label is peeled from a backing material and presented to the surface of the plate. The label is held against the surface of the plate by the subatmospheric pressure being conducted by the plenum and the plurality of holes. The volume of the plenum is selectively varied to cover selected ones of the plurality of holes as a function of a size of the label. Thereafter, the subatmospheric pressure is replaced by a superatmospheric pressure flowing through the plenum and the plurality of holes to blow the label from the surface of the plate onto the surface of the part.

These and other objects and advantages of the present invention will become more readily apparent during the following detailed description taken in conjunction with the drawings herein.

DETAILED DESCRIPTION OF THE INVENTION

Figure 1:
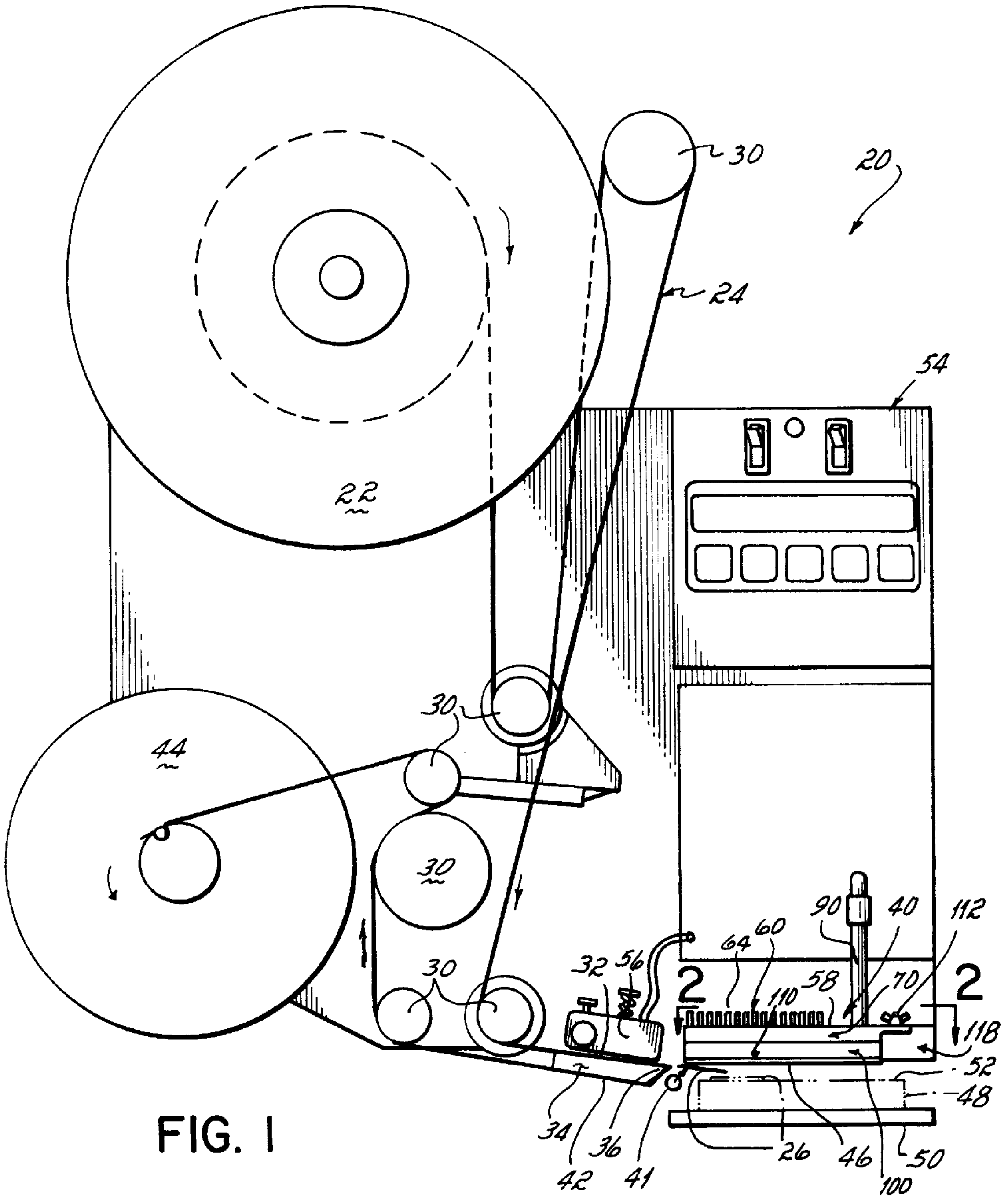
FIG. 1 is a schematic end view of a labeling machine utilizing a label handling apparatus in accordance with the principles of the present invention.
Figure 1A:
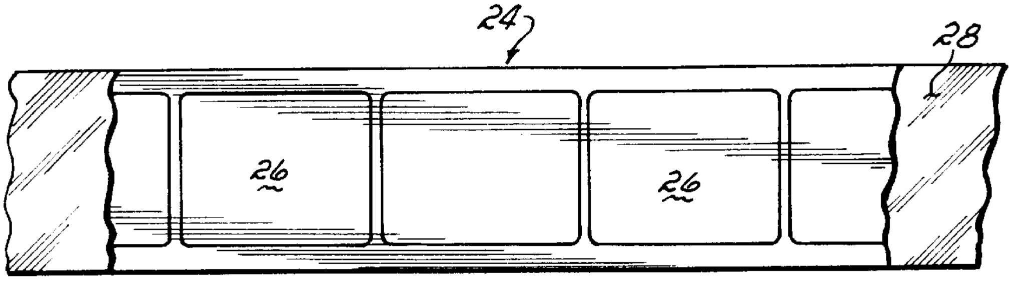

Referring to FIG. 1, a labeling machine 20 has a supply reel 22 containing a continuous label strip 24. As shown in FIG. 1A, the label strip 24 includes a plurality of labels 26 located on a web or backing material 28. The label strip 24 is threaded over various feed and idler rollers typically shown at 30 across an upper surface 32 of a peeler plate 34 and around a forward peeling edge 36 thereof. Normally, the backing material 28 is thin and flexible, whereas the label 26 is normally thicker and stiffer. Consequently, as the backing material 28 bends around the forward edge 36 of the peeler plate, the label 26 will separate from the backing material 28 and move in a generally horizontal direction beneath a label handling apparatus 40. A nozzle 41 may provide an upwardly directed air jet to facilitate directing the label 26 up against the label handling apparatus 40. The backing material 28 absent the labels 26 is routed along a path that extends past the lower surface 42 of the peeler plate 34 over additional feed rollers 30 and onto a take up reel 44. As the backing material 28 moves over the edge 36 of the peeler plate, the label 26 moves across the lower surface 46 of the label handling apparatus 40 and is held against the lower surface 46 by a suction force. When a part 48 is moved by a conveyor 50 to a desired label application position, a positive pressure is discharged from the lower surface 46 to blow the label 26 off the lower surface 46 and on to a substrate, for example, an upper surface 52 of the part 48. The operation of the label machine 20 is controlled by an electronic and pneumatic control system 54 which detects the presence of a label using a label sensor 56. The control system 54 is a known control, for example, the control associated with the previously identified model 2111 ST labeler from Label-Aire Inc., and therefore, further description of the control is not required.

Figure 2:
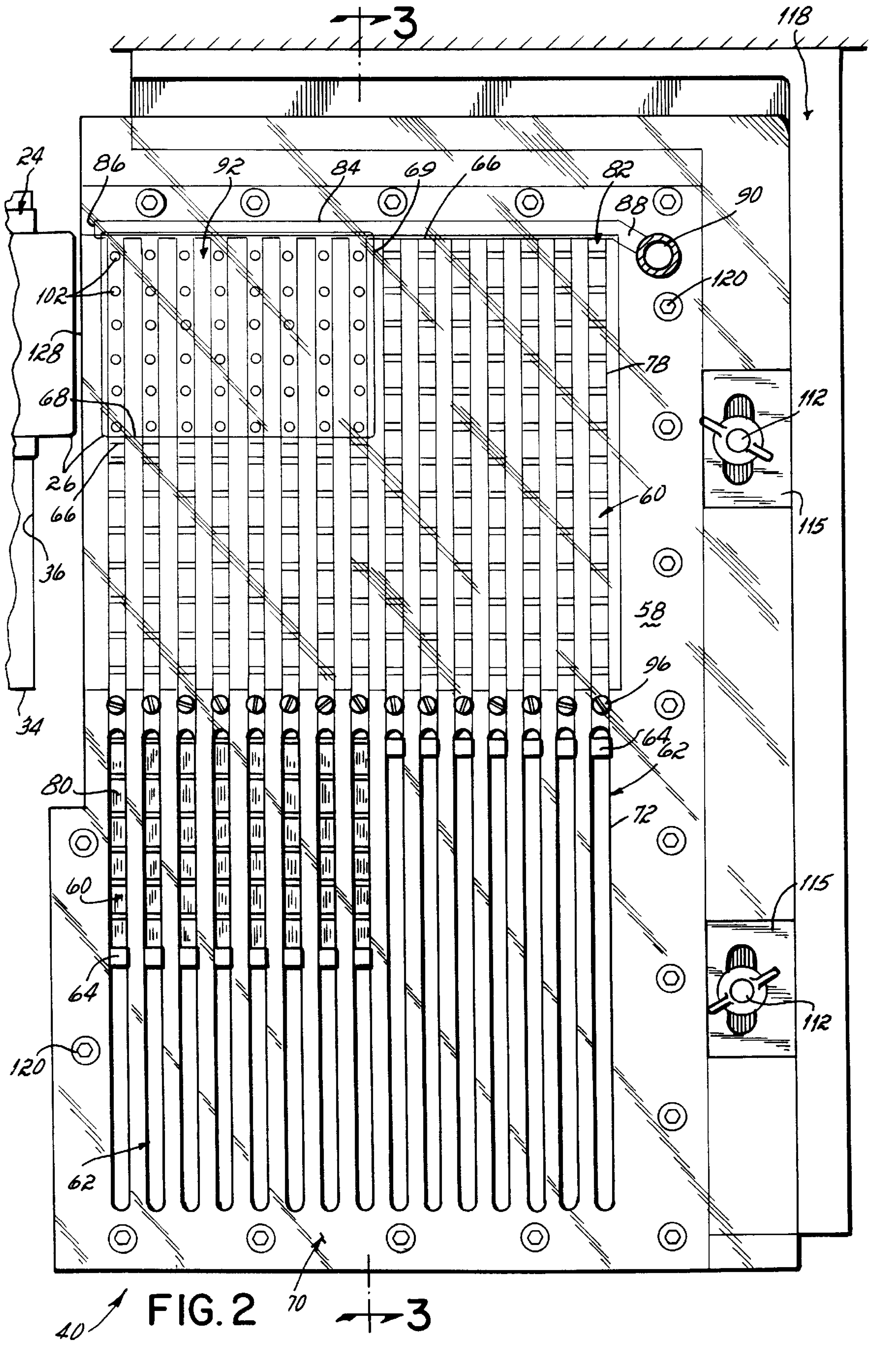
FIG. 2 is a top plan view of the label handling apparatus as seen on line 2—2 of FIG. 1.

Referring to FIG. 2, the label handling apparatus 40, as viewed from the top is made principally of a clear, light conducting, polycarbonate material, for example, a "LEXAN" plastic material. Consequently, the label 26, which is located on the bottom surface 46 (FIG. 1), is clearly visible from top surface 58. A plurality of elements, for example, adjustable stainless steel sliding pins 60 are disposed in respective cavities or slots 62. Each of the sliding pins is generally L-shaped and has a shorter handle portion 64 extending generally vertically upward from the upper surface 58 and a longer body portion 80 disposed in a respective slot 62. Using the handles 64, the pins 60 can be moved within and along their respective slots 62. Preferably, the pins 60 are adjusted to generally bound the peripheral edges 68, 69 of the label 26. Therefore, by simply sliding the pins 60, the labeling handling apparatus 40 can, within seconds, be adjusted to accommodate any size label 26 to be dispensed. The label 26 is held on to the bottom surface 46 of the label handling apparatus by a subatmospheric, or, suction force created within a plenum inside the label handling apparatus 40. The suction is then switched to a superatmospheric, or, positive pressure to blow the label 26 from the lower surface 46 and onto the part 48.

Figure 3:
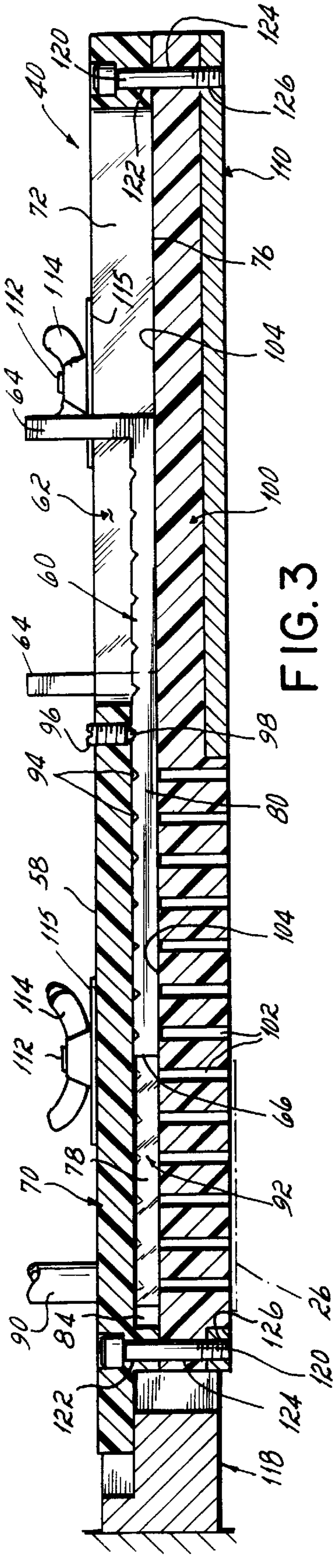
FIG. 3 is a cross-sectional view taken along line 3—3 of FIG. 2 and illustrates the details of the sliding pins and plenum.
Figure 4:
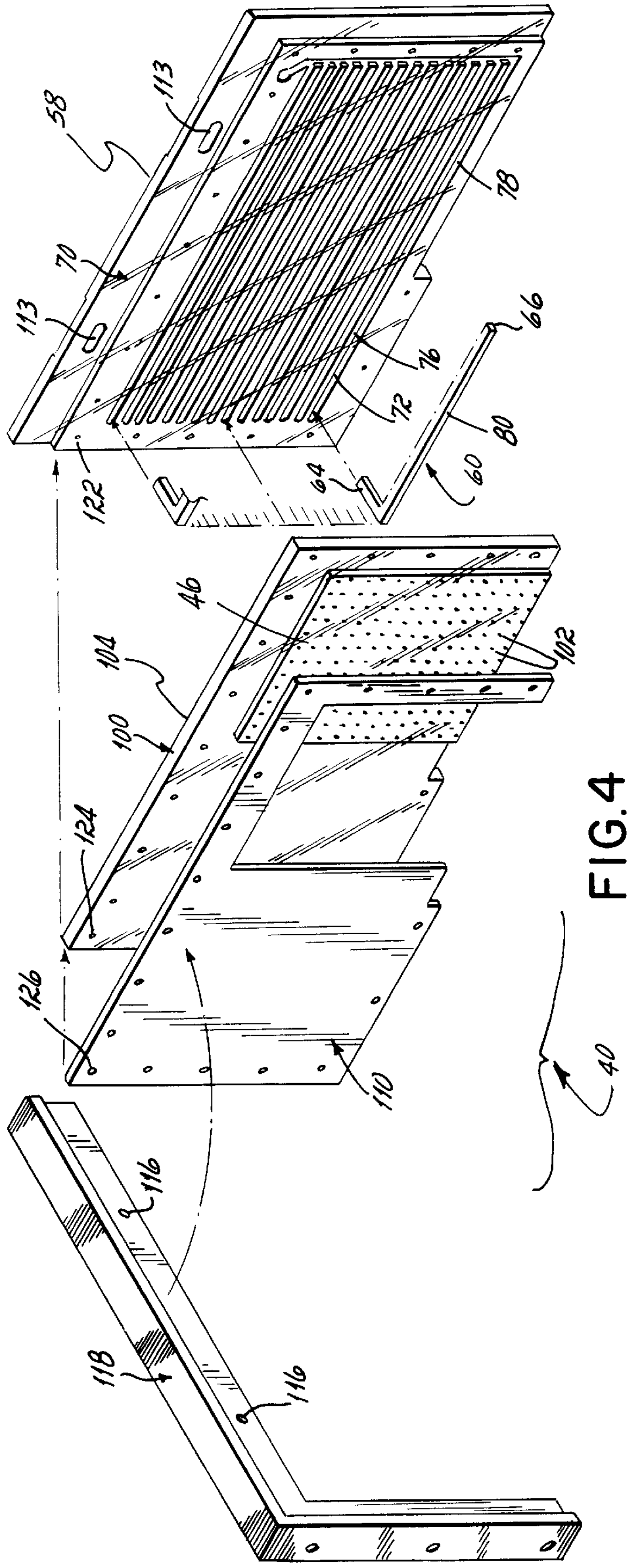
FIG. 4 is a disassembled view of the label handling apparatus of the present invention.

Referring to FIGS. 3 and 4, the labeling handling apparatus 40 is comprised of an adjustable plenum plate 70 made of a clear material, preferably a clear polycarbonate. The plenum plate 70 includes slots 62 having first slot portions 72 that extend through the thickness of the plenum plate 70 and, therefore, intersect both its top and bottom surfaces 58, 76, respectively. The slots 62 have second slot portions 78 that intersect the bottom surface 76, but not the top surface 58. The slot portions 78 have a height that is slightly larger than the main body portion 80 of the sliding pins 60. Further, as shown in FIG. 2, the width of the slots 62 is only slightly larger than the width of the sliding pins 60. Preferably, the body portions 80 of the pins 60 have a cross section that is smaller than the cross section of slot portions 78 but only by an amount necessary to allow the pins 60 to slide within the slots 62. A channel 84 extends across the adjustable plenum plate 70 and intersects the ends of the slot portions 78 at a location beyond the ends of the pins 60 when they are inserted their full length into the slot portions 78, as shown by the pin 82 in FIG. 3. As shown in FIG. 2, one end 86 of the channel 84 is closed, and its other end 88 intersects a pressurized fluid source 90, for example, a source of pressurized air. Therefore, the channel 84 and the slot portions 78 of the slots 62, which are not occupied by pins 60, form a chamber or plenum 92 of pressurized fluid. The size of the plenum 92 is adjusted by sliding the pins 60 within the slots 62, and hence, the plenum 92 can be easily adjusted to provide the necessary suction and pressure forces that are required for different size labels.

Referring to FIGS. 2 and 3, each of the pins 60 further include a plurality of notches or slots in the upper surface of their respective pin bodies 80. The notches are equally spaced along the length of their respective pin bodies 80 and extend in a direction substantially perpendicular to the length of their respective pin bodies 80. A plurality of detents 96 are disposed in the upper surface 58 of the plenum plate 70 at locations directly above the slot portions 78. The lower ends of the detents intersect the slot portions 78 such that a spring biased ball 98 in the end of each detent contacts an upper surface of a respective pin 60. As the pins 60 are slid in the slots 62, the balls 98 enter the notches 94 to provide a repeatable indicator of an increment of motion of the pins 60.

The label handling apparatus 40 further includes a grid plate 100, which is also made of a clear material, preferably a clear polycarbonate. The grid plate 100 is mounted against the lower surface 76 of the plenum plate 70 such that the pressurized fluid or air is sealed between the plates 70, 100. The grid plate 100 has a plurality of holes 102 that are arranged in a grid pattern. That is, the pattern of holes 102 defines a plurality of columns of holes which also define a plurality of substantially perpendicular rows of holes. The holes 102 extend through the thickness of the plate 100 and intersect its upper and lower surfaces 104 and 46, respectively. As shown in FIGS. 2 and 3, moving the pins 60 into respective slot portions 72 forms the plenum 92 in respective slot portions 78. In addition, as the pins 60 are moved, holes 102 are uncovered to intersect the plenum 90.

Uncovering the holes 102 permits pressurized air in the plenum 92 to pass through the holes 102. If the air is under a negative pressure with respect to atmosphere, that is, a partial vacuum, ambient air will be drawn from the lower surface 46, through the holes 102, into the plenum 92 and into the source 90. Consequently, a suction force will be created that holds the label 26 against the lower surface 46 of the grid plate 100 such that the label 26 is supported and suspended above the top surface 52 of the part 48. At the appropriate time, the control 54 terminates the negative air pressure and suction force and initiates a positive air pressure, which causes pressurized air to flow from the source 90, through the plenum 92, through the holes 102 and out the lower surface 46. That positive air pressure blows the label 26 off the surface 46 of the grid plate 100 and on to the upper surface 52 of the part 48.

Referring to FIGS. 3 and 4, a stainless steel support plate 110 is connected to and covers the lower side of the grid plate 100 except for the pattern of holes 102. The label handling apparatus 40 is preferably mounted by a screw fasteners 112 that extend through slotted holes 113 in the label handling apparatus 40 into a threaded hole 116 of a mounting bracket 118. A wing nut 114 on the screw 112 bears against a stainless steel washer or bearing plate 115 and is used to tighten and loosen the label handling apparatus with respect to the mounting plate 118. The mounting bracket 118, in turn, is connected to the labeling machine 20 in a known manner. The adjustable plenum plate 70, grid plate 100, and support plate 110 are connected into a unitary plate assembly by fasteners, preferably screws (not shown) that extend through clearance holes 122 of the plenum plate 70, clearance holes 124 of the grid plate 100, and into threaded holes 126 of the metal support plate 110.

Figure 5:
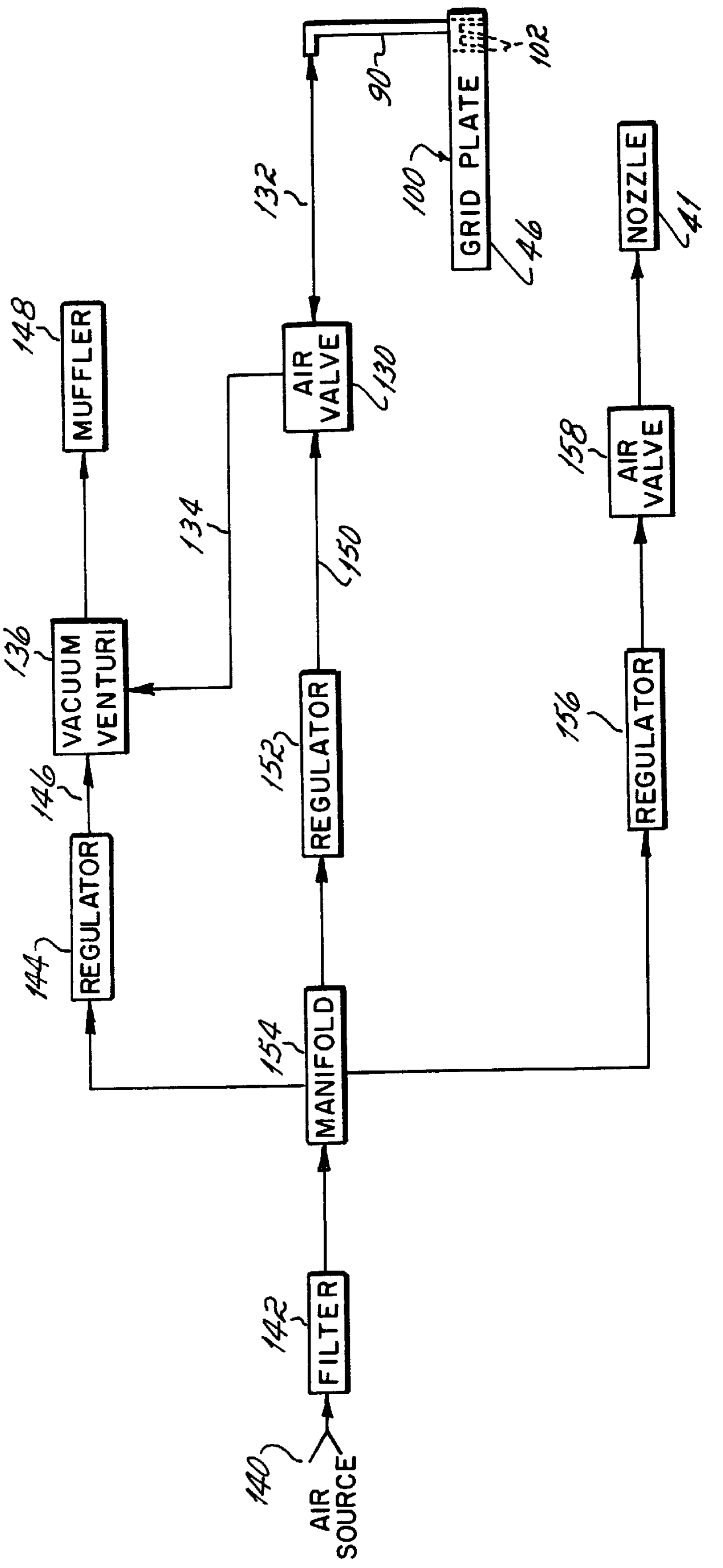
FIG. 5 is a schematic block diagram of the air supply system for the label handling apparatus.

Referring to FIG. 5, air flow through the pipe 90 and air holes 102 in the grid plate 100 is controlled by the air valve 130. In its first or de-energized state, the air valve 130 connects flow paths 132, 134. A vacuum venturi 136 has an inlet connected to flow path 134. The vacuum venturi 136 receives air from an air source 140 that normally provides pressurized air at 90 pounds per square inch ("psi"). The pressurized air from source 140 passes through a filter 142, through regulator 144 and into the venturi 136 via flow path 146. Preferably, the regulator 144 regulates the air down to 20 psi. In a known manner, as air flows through the vacuum venturi 136, a negative air pressure or partial vacuum pressure is provided in flow path 134. Therefore, a suction is created on the bottom 46 of the grid plate 100 by air being drawn through the holes 102, pipe 90, air valve 130 and into the vacuum venturi 136. That suction air and the pressurized air entering the vacuum venturi 136 via flow paths 134 and 146, respectively, are exhausted to the atmosphere through a muffler 148. The pneumatic circuit of FIG. 5 is only approach to placing plenum 92 under alternately, subatmospheric and superatmospheric pressures, and as will be appreciated by those skilled in the art, other pneumatic circuits and devices may be used, for example, by alternately switching to the input and output of a fan.

In a known manner, when it is desired to blow a label off of the bottom surface 46 of the grid plate 100, the control 54 (FIG. 1) provides a signal to the air valve 130, switching the air valve to a second state which disconnects the flow paths 132 and 134 and connects flow path 132 with flow path 150. In that state, the air valve 130 receives pressurized air from regulator 152, which is connected to a manifold 154 that, in turn, is connected to the filter 142 and air source 140. The regulator 152 preferably regulates the pressurized air to the same 90 psi that is being supplied by the air source 140. The pressurized air from regulator 152 flows through the air valve 130, into pipe 90 and out of holes 102 on surface 46 and is effective to blow a label off the bottom 46 of the grid plate 100. Subsequently, the control 54 de-energizes the air valve 130, thereby disconnecting flow paths 132, 150 and reconnecting flow paths 132 and 134 to re-establish the flow of suction air on the bottom surface 46. The manifold 154 also supplies pressurized air to a regulator 156, air valve 158 and nozzle 41. Again, in a known manner, at appropriate times, the control 54 activates the air valve 158 to provide a stream of pressurized air from the nozzle 41.

In use, on some packaging lines, it may be necessary to change labels up to twenty times in one operating shift. When it is desired to apply a different label, the supply reel 22 containing the previously used label is removed, and a supply reel containing the new label is mounted on the labeling machine 20. The label strip 24 is fed around the feed rollers 30, over the peeler plate 34 and onto the take up reel 44. In a known manner and with the aid of the control 54, the label strip 24 is aligned with the peeler plate 34 and the label sensor 56. That alignment process also determines and fixes the position and orientation of the label 26 as it leaves the backing material 28 is transferred to the label handling apparatus 40. A number of pins 60 adjacent the receiving edge 128 of the grid plate 100 are moved to open selected holes 102 and create a preliminary plenum 92. The control 54 is used in the known manner to initiate a suction through the uncovered holes 102. Next, the control 54 is used to manually feed or jog the label strip 24 such that a single label 26 is removed from the backing material 28 and transferred to the bottom 46 of the grid plate 100. The label 26 is held on the bottom 46 of the label handling apparatus 40 by the suction through the uncovered holes 102.

At this point, two adjustments are made. First, by using the handles 64, the sliding pins 60 adjacent the label are moved in their slots 62 until they are located adjacent the peripheral sides 68 and 69 of the label 26. As will be appreciated, the clear plastic construction of the label handling apparatus 40 permits the label on the lower surface 46 of the label handling apparatus 40 to be viewed from the upper surface 58. Thus, the label 26, air holes 102, sliding pins 60, and plenum size 92 may be simultaneously viewed from the top of the apparatus 40 to facilitate both the adjustment of the air holes 102 with respect to the label 26 and the adjustment of the pins 60 to tailor the plenum size 92 to a particular label.

Next, the wing nuts 114 are loosened so that the label handling apparatus 40 can be slidably adjusted in a direction parallel to the receiving edge 128 and perpendicular to the direction of label motion off of the backing material 28. The position and orientation of the label 26 with respect to the holes 102 is a function of how the label strip 24 is aligned with respect to the label detection device 56 and peeler plate 34. Since the exact position of the label with respect to the peeler plate 34 will vary slightly from label to label, the longitudinal adjustment of the label handling apparatus 40 permits the holes 102 in the grid plate 100 to be properly aligned with the label. Normally, the apparatus 40 is aligned so that the holes 102 are symmetrically aligned with respect to the label 26. Again, the clear plastic construction of the label handling apparatus 40 permits the label 26, air holes 102, and sliding pins 60 to be simultaneously viewed from the top 58 to facilitate this adjustment.

Thereafter, the pins 60 may be further adjusted to provide a plenum 92 of the desired size. The control 56 is then used to switch the pressurized air in the plenum 92 from a suction force through the holes 102 to a blowing force through the holes 102, which is effective to blow the label 26 off of the bottom 46 and onto the part 48. Several labels 26 may be cycled across the grid plate 100 in order to fine tune the relative positions of the air holes 102, label 26, and the size of the plenum 92. After that preliminary alignment, the set up procedure continues to apply several labels to parts 48 as they move along the conveyor 50. Again, fine tuning of the size of the plenum 92 by sliding the pins 60 may be required in order to repeatably and accurately blow the label 26 onto part 48. For example, in some cases, the label is best handled when the pins 60 are adjusted to provide a plenum 92 having a area smaller than the area of the label 26. At the end of the alignment process, the pattern of the sliding pins for that label may be recorded for future reference. Either, the location and number of uncovered holes 102 or the location and number of notches 94 with respect to the detents 96 may be recorded.

Thus, the label handling apparatus 40 has the advantage of being able to align and set up the label machine to a different label more easily and quickly than the prior systems. Savings in set up time, especially for labels being used the first time, can be up to 75 percent. Further, the construction of the label handling apparatus 40 has a single plenum 92 to provide both a partial vacuum and positive pressure to the label. The single plenum construction has fewer parts, is more compact, and is potentially more reliable than the prior system. Further, the construction of the label handling apparatus 40 permits it to be relatively easily installed on existing labeling machines.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, while the adjustable plenum plate 70 and grid plate 100 are preferably made of a clear polycarbonate material, other clear materials, such as plexiglass, polystyrene, etc. may be used. Alternatively, while it is preferable to make the plenum plate 70 and grid plate 100 from a transparent material, the advantages of the adjustable plenum are realized even if the plenum plate 70 and grid plate 100 are opaque. Consequently, the plenum plate 70 and grid plate 100 may be made from any opaque material, for example, aluminum, steel or a plastic material. In another embodiment, the pins 60 may be driven by a motor so that the adjustment of the pins can be programmed to occur automatically.

In another embodiment, instead of selectively opening and closing a single row of the holes 102, the slots 62 and pins 60 may be wider to cover two adjacent rows of holes. In a still further embodiment, instead of being located in the slots 62, the pins 60 could be mounted in slots that are machined in the lower surface 46 of the plate 100. As another alternative, the areas between the slots 62 can be removed to form a single cavity and the pins 60 replaced by a two plates that slide in mutually perpendicular directions to selectively block and unblock the holes 102.

While the invention is illustrated as receiving a label on a lower side 46 of the plate 100, as will be appreciated, the peeler plate 34 and label handling apparatus 40 may be rotated 90° so that the surface 46 is a vertical surface. Thus, the label will be held on that vertical planar surface 46 by the suction pressure and blown onto a side surface of the part by the positive pressure. As will be appreciated, the peeler plate 34 and label handling apparatus 40 may be mounted at any angle, even with the surface 46 directed upward, to apply a label to any surface of a part. Therefore, the invention in its broadest aspects is not limited to the specific details shown and described. Consequently, departures may be made from the details described herein without departing from the spirit and scope of the claims which follow.

What is claimed is:

1. A label handling apparatus for receiving a label being removed from a backing material by a peeler and applying the label onto a surface, the label handling apparatus comprising:

a source of fluid selectively providing a fluid with subatmospheric and superatmospheric pressures;

a plate having a plurality of holes with first ends in fluid communication with the source of fluid and second ends intersecting a side of the plate, the plate being adapted to be located near the peeler to receive a peeled label presented to the side of the plate by the peeler; and at least two elements disposed with respect to the plate, each of the at least two elements being slidable with respect to each other and the plate to selectively block and unblock fluid communication between selected ones of the plurality of holes and the source of fluid, whereby the peeled label is maintained against the side of the plate in response to the source of fluid providing fluid at subatmospheric pressure, and thereafter, upon the source of fluid providing fluid at the superatmospheric pressure, the peeled label is discharged from the side of the plate onto the surface.

2. The apparatus of claim 1 wherein the plate has a first cavity disposed between the first ends of the holes and the source of fluid and a first element is disposed for sliding motion in the first cavity.

3. The apparatus of claim 3 wherein the plate has a second cavity disposed between the first ends of the holes and the source of fluid and a second element is disposed for sliding motion in the second cavity.

4. The apparatus of claim 1 wherein the plate has a plurality of cavities disposed between the first ends of the holes and the source of fluid and a plurality of elements is disposed for sliding motion in respective ones of the plurality of cavities.

5. The apparatus of claim 1 wherein the side of the plate is a lower side of the plate.

6. A label handling apparatus for receiving a label being removed from a backing material by a peeler and applying the label onto a surface, the label handling apparatus comprising:

a source of fluid selectively providing a fluid at a positive pressure and a fluid at a suction pressure;

a plate adapted to be located near the peeler to receive a peeled label presented to a lower side of the plate by the peeler, the plate having a plurality of holes with lower ends intersecting the lower side of the plate, and a plurality of chambers intersecting the plurality of holes and disposed between the lower side of the plate and the source of pressurized fluid; and a plurality of elements disposed in respective ones of the plurality of chambers, each of the elements being movable within its respective chamber to selective block and unblock fluid communication between selected ones of the plurality of holes and the source of pressurized fluid, whereby the upon the source of pressurized fluid providing fluid at a suction pressure, the peeled label is maintained against the lower side of the plate, and thereafter, upon the source of pressurized fluid providing fluid at a positive pressure, the peeled label is discharged from the lower side of the plate onto the surface.

7. The apparatus of claim 6 wherein the plurality of chambers is a plurality of enclosed slots and the plurality of elements is a plurality of pins disposed in respective ones of the plurality of slots.

8. The apparatus of claim 7 wherein the plurality of slots form a plurality of air plenums for providing pressurized air to respective groups of the holes.

9. The apparatus of claim 7 wherein the adjusting pins are restrained from motion at predetermined positions with respect to the holes.

10. The apparatus of claim 9 the adjusting pins have notches and the apparatus includes detents engaging respective notches for restraining motion of the adjusting pins.

11. The apparatus of claim 10 wherein the detents are spring biased ball detents mounted in adjusting plate adjacent respective holes.

12. The apparatus of claim 7 wherein the label handling apparatus is adjustably mounted with respect to the peeler to permit the holes in the plate to be selectively aligned with respect to the label.

13. The apparatus of claim 7 wherein the adjusting pins are made from material having different light conducting properties than the plate to permit the adjusting pins to be readily viewed from an upper side of the plate.

14. The apparatus of claim 7 wherein in the plurality of holes in the plate are formed in a grid pattern.

15. The apparatus of claim 14 wherein the pattern of holes includes a plurality of columns of holes each column of holes defining a respective substantially perpendicular row of holes.

16. The apparatus of claim 7 wherein the plate is made from a material permitting the label on the lower side of the plate to be viewed from an upper side of the plate.

17. The apparatus of claim 16 wherein the plate is made from a light conducting material.

18. The apparatus of claim 17 wherein the plate is made from a clear plastic material.

19. A label handling machine for applying to a surface of a part one of a plurality of labels removably located on a backing material comprising:

a rotatable supply reel for holding the backing material containing the labels;

a rotatable takeup reel for receiving the backing material after the labels have been removed from the backing material;

a plurality of rollers for feeding the backing material between the supply and takeup reels;

a peeler having a peeling edge overwhich the backing material passes for removing the label from the backing material;

a source of fluid selectively providing a fluid at a positive pressure and a fluid at a suction pressure;

a plate disposed near the peeling edge to receive a peeled label presented to a side of the plate by the peeler, the plate having a plurality of holes with lower ends intersecting the side of the plate, and a plurality of chambers intersecting the plurality of holes and disposed between the side of the plate and the source of pressurized fluid; and a plurality of elements disposed in respective ones of the plurality of chambers, each of the elements being movable within its respective chamber to selective block and unblock fluid communication between selected ones of the plurality of holes and the source of pressurized fluid, whereby the upon the source of pressurized fluid providing fluid at a suction pressure, the peeled label is maintained against the side of the plate, and thereafter, upon the source of pressurized fluid providing fluid at a positive pressure, the peeled label is discharged from the side of the plate onto the surface.

20. A method of applying a label to a surface of a part comprising:

applying a subatmospheric pressure to a plenum connected to a plurality of holes intersecting a surface of a plate;

peeling a label from a backing material with a peeler;

presenting the label from the peeler to the surface of the plate;

holding the label against the surface of the plate with the subatmospheric pressure being conducted by the plenum and the plurality of holes;

selectively and independently moving two separate elements disposed with respect to each other and the plate, motion of each of the elements varying a volume of the plenum by covering selected ones of the plurality of holes as a function of a size of the label;

terminating the application of the subatmospheric pressure to the plenum; and applying a superatmospheric pressure to the plenum and through the plurality of holes to blow the label from the surface of the plate and onto the surface of the part.

* * * * *

UNITED STATES PATENT AND TRADEMARK OFFICE

CERTIFICATE OF CORRECTION

PATENT NO. : 5,885,406

DATED : March 23, 1999

INVENTOR(S) : Tiefel

It is certified that error appears in the above-indentified patent and that said Letters Patent is hereby corrected as shown below:

In column 6, line 11, after "by", delete "a".
In column 6, line 43, after "only", insert --one--.
In column 7, line 14, after "material 28", insert --and--.
In column 8, line 3, delete "a", and insert therefor --an--.
In column 8, line 47, before "two", delete "a".

In claim 3, column 9, line 23, delete "3", and inset therefor --2--.
In claim 6, column 9, line 51, delete "selective", and insert therefor --selectively--.
In claim 6, column 9, line 54, after "whereby", delete "the".
In claim 19, column 10, line 56, delete "selective", and insert therefor --selectively--.
In claim 19, column 10, line 59, after "whereby", delete "the".
In claim 11, column 10, line 8, after "adjusting", insert --the--.
In claim 14, column 10, line 17, after "wherein", delete "in".

Signed and Sealed this

Sixteenth Day of November, 1999

*Attest:*

Q. TODD DICKINSON

*Attesting Officer*

*Acting Commissioner of Patents and Trademarks*